(12) United States Patent
Kitai et al.

(10) Patent No.: US 10,596,812 B2
(45) Date of Patent: Mar. 24, 2020

(54) PRINTING APPARATUS AND CONTROL METHOD THEREOF

(71) Applicant: CANON KABUSHIKI KAISHA, Tokyo (JP)

(72) Inventors: Satoshi Kitai, Kawasaki (JP); Masahiko Umezawa, Kawasaki (JP); Kouichi Serizawa, Yokohama (JP); Kazuya Koizumi, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/991,419

(22) Filed: May 29, 2018

(65) Prior Publication Data

US 2018/0345664 A1    Dec. 6, 2018

(30) Foreign Application Priority Data

May 31, 2017    (JP) ................. 2017-108318

(51) Int. Cl.
*B41J 2/045*    (2006.01)
*B41J 2/14*    (2006.01)
(Continued)

(52) U.S. Cl.
CPC ............ *B41J 2/04586* (2013.01); *B41J 2/14* (2013.01); *B41J 2/155* (2013.01); *B41J 2/2103* (2013.01); *H04N 1/034* (2013.01); *H04N 1/12* (2013.01); *H04N 1/1911* (2013.01); *H04N 1/1917* (2013.01); *H04N 1/32571* (2013.01); *H04N 1/32593* (2013.01); *H04N 1/32598* (2013.01); *B41J 2002/14491* (2013.01);
(Continued)

(58) Field of Classification Search
CPC ........ B41J 29/38; B41J 2/155; B41J 2/04543; B41J 2/16585; B41J 2202/21; B41J 2/04586; B41J 2202/20; B41J 2202/17; B41J 2/14; B41J 2/2146; B41J 2/2103; B41J 2002/14491; B41J 2202/13; H04N 1/32598; H04N 1/034; H04N 1/12; H04N 1/1911; H04N 1/1917; H04N 1/32571; H04N 1/32593

See application file for complete search history.

(56) References Cited

U.S. PATENT DOCUMENTS

2011/0285779 A1*  11/2011  Yamada ................. B41J 2/2103
                                                    347/15
2017/0087823 A1*   3/2017  Nakamura ........... B41J 2/04586

FOREIGN PATENT DOCUMENTS

JP    H11-232211 A    8/1999

* cited by examiner

*Primary Examiner* — Jannelle M Lebron
(74) *Attorney, Agent, or Firm* — Venable LLP

(57) ABSTRACT

According to an embodiment of the present invention, to improve processing performance, a printing apparatus that performs printing by using a printhead formed by a plurality of headchips includes one CPU, a table configured to store processing contents set by the CPU, and a plurality of processing units configured to process, in parallel, printing data to be used in each headchip by commonly using the table and in accordance with the processing contents set in the table. In addition, the apparatus includes a plurality of control units configured to wait for the completion of the processing of each processing unit, synchronize the plurality of processing units for next processing, and cause each of the processing units to execute the next processing in accordance with the processing contents set in the table.

18 Claims, 12 Drawing Sheets

(51) Int. Cl.
  *B41J 2/21*   (2006.01)
  *B41J 2/155*  (2006.01)
  *H04N 1/32*   (2006.01)
  *H04N 1/034*  (2006.01)
  *H04N 1/191*  (2006.01)
  *H04N 1/12*   (2006.01)
(52) U.S. Cl.
  CPC ........ *B41J 2202/13* (2013.01); *B41J 2202/17* (2013.01); *B41J 2202/20* (2013.01); *B41J 2202/21* (2013.01)

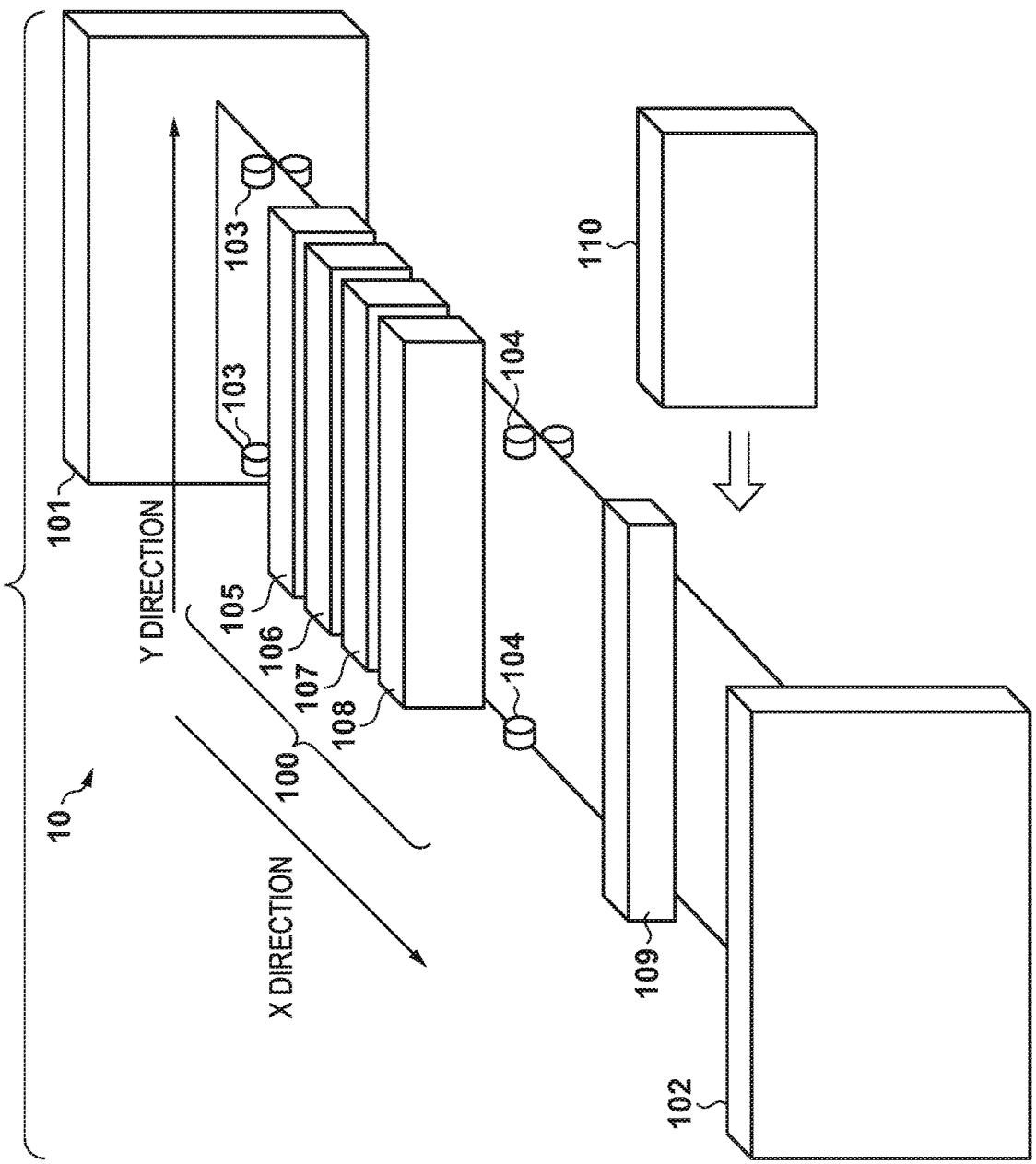

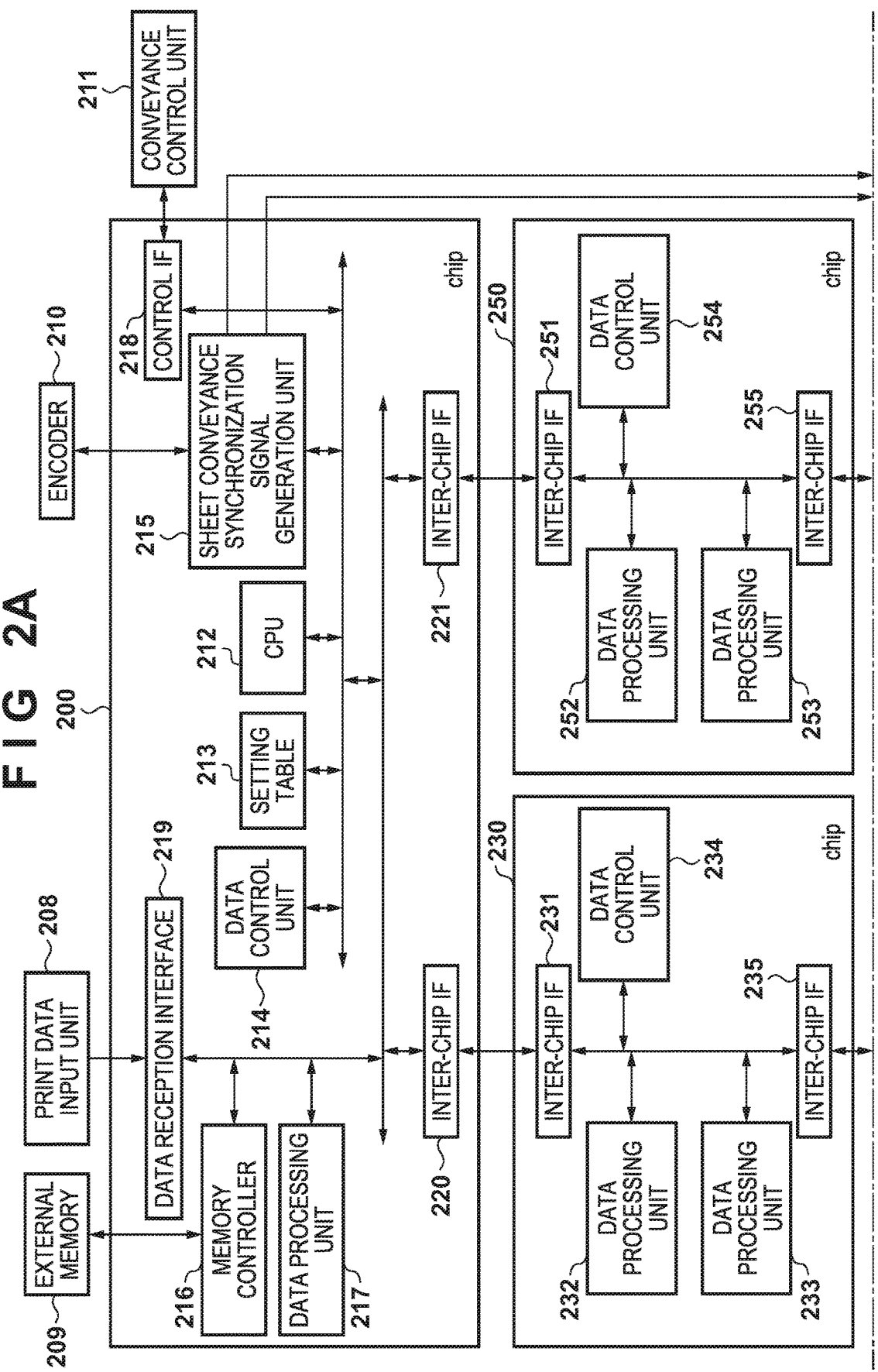

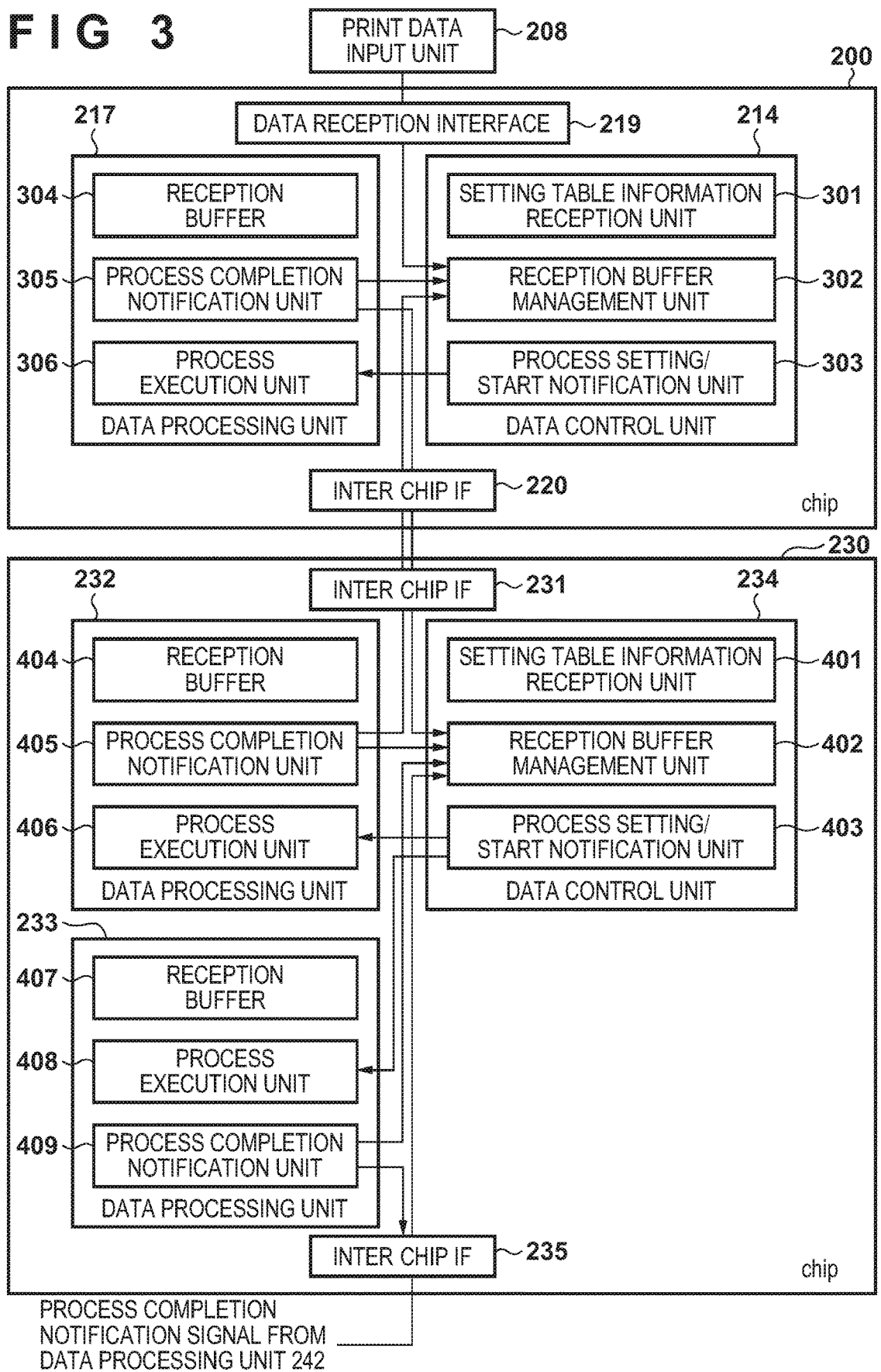

PRINTING APPARATUS AND CONTROL METHOD THEREOF

BACKGROUND OF THE INVENTION

Field of the Invention

The present invention relates to a printing apparatus and a control method thereof, and particularly to, for example, a printing apparatus that employs parallel processing to perform high-speed processing of print data which is used for printing an image by a plurality of printheads, and a control method of the printing apparatus.

Description of the Related Art

In recent years, the resolution and the printing speed of printing apparatuses have dramatically increased. Accordingly, a printing apparatus is required to process a large amount of print data within a short time.

When a CPU is to process a large amount of data, improvement of the processing speed is limited because the processing speed depends on the performance of the CPU. Thus, in general, a dedicated processing unit for data processing and data transfer is arranged. In such an arrangement, a processing unit, which is to generate the print data, processes a predetermined amount of data based on an instruction from the CPU and transmits a completion notification to the CPU when the processing has been completed. On the other hand, upon receiving the completion notification from the processing unit, the CPU sets the settings of the processing unit to execute the next processing and issues a processing activation instruction. In this manner, the CPU puts the dedicated processing unit in charge of data processing and data transfer, and the CPU itself need only manage the activation and completion of the processing and the setting of the processing contents of the processing unit.

For example, although a DMA controller is known as a dedicated processing unit that performs a data transfer operation, the smaller the unit of processing which can be executed by the DMA controller at once is, the ratio of time in which the CPU intervenes in the processing is increased, and thus the effect of processing speed improvement is reduced. Also, in a case in which the CPU receives a completion notification from the DMA controller while executing a plurality of processing operations, time is required until the next control instruction is issued by the CPU to the DMA controller, and the DMA controller is set to a standby state. This prevents, as a result, the improvement of the processing speed.

To solve such a problem, there is proposed, as disclosed in Japanese Patent Laid-Open No. 11-232211, a DMA controller which includes a descriptor table. The Scatter-Gather DMA Controller Core (Embedded Peripheral IP User Guide), which is the intellectual property (IP) of Altera Corporation, is an example of such a DMA controller. In this kind of a device, the CPU describes a plurality of processing contents in a descriptor table in advance, and the DMA controller sequentially reads out and executes the contents of the descriptor table. In this arrangement, although the CPU is required to perform processing to write the control contents in the descriptor table in advance, the CPU need not wait for the completion of the processing to perform activation.

Additionally, in order to increase the speed of print data generation processing, parallel processing can be performed to make a plurality of dedicated processing units operate in parallel. According to this processing, although the circuit scale will increase in accordance with the increase in the number of processing units to be operated in parallel, the processing speed can be increased.

However, in a case in which a plurality of processing units are to be controlled by using a descriptor table as described above, the following problems are posed. That is:

(1) When a plurality of processing units of a plurality of chips are to be controlled by a single CPU, if the control contents of the respective processing units are to be set in the descriptor table, the setting operation itself to the descriptor table puts a load on the CPU.

(2) When the control contents are to be suddenly changed, it is difficult to rewrite a plurality of descriptor table settings at once, and thus it becomes difficult to synchronize the plurality of processing units in order to perform control change.

(3) In a case where an arrangement that includes a CPU for each processing unit or each processing chip is employed, communication and synchronization between the CPUs are required, and it becomes difficult to design the firmware for operating the CPUs.

SUMMARY OF THE INVENTION

Accordingly, the present invention is conceived as a response to the above-described disadvantages of the conventional art.

For example, a printing apparatus and a control method of the printing apparatus according to this invention are capable of easily executing control change synchronization on a plurality of processing units without increasing a table setting load even if a single CPU is to control the plurality of processing units.

According to one aspect of the present invention, there is provided a printing apparatus that performs printing by using a printhead formed from a plurality of headchips, comprising: one CPU; a table configured to store processing contents set by the CPU; a plurality of processing units configured to process, in parallel, print data to be used in each of the plurality of headchips by commonly using the table and in accordance with the processing contents set in the table; a plurality of control units configured to wait for processing completion in each of the plurality of processing units, synchronize the plurality of processing units for next processing, and cause the plurality of processing units to execute the next processing in accordance with the processing contents set in the table; and a plurality of drive circuits configured to drive, based on the print data processed by the plurality of processing units, each of a corresponding plurality of headchips.

According to another aspect of the present invention, there is provided a control method of a printing apparatus that performs printing by using a printhead formed from a plurality of headchips, the printing apparatus including one CPU and a table configured to store processing contents set by the CPU, the method comprising: processing, in parallel, by a plurality of processing units, print data to be used in each of the plurality of headchips by commonly using the table and in accordance with the processing contents set in the table; waiting for processing completion in each of the plurality of processing units, synchronizing the plurality of processing units for next processing, and causing the plurality of processing units to execute the next processing in accordance with the processing contents set in the table; and driving, based on the print data processed by the plurality of processing units, each of a corresponding plurality of head-chips by a plurality of drive circuits.

The invention is particularly advantageous since it is possible, even in an arrangement which includes a single CPU and a table, for a plurality of processing units to use the table commonly and execute parallel processing while referring to the table, and the processing synchronization of the plurality of processing units can be performed by a plurality of control units. As a result, the processing load of the CPU can be reduced, and processing activation and termination can be performed without intervention of the CPU. It is also possible to cope with a sudden change in settings by rewriting the corresponding setting table.

Further features of the present invention will become apparent from the following description of exemplary embodiments (with reference to the attached drawings).

BRIEF DESCRIPTION OF THE DRAWINGS

FIG. 1 is a perspective view showing a schematic arrangement of a printing apparatus according to an exemplary embodiment of the present invention;

FIGS. 2A and 2B are block diagrams showing the arrangement of a control unit of the printing apparatus shown in FIG. 1;

FIG. 3 is a block diagram, showing details of a part of the arrangement shown in FIGS. 2A and 2B, for explaining the detailed operation of data processing units and data control units;

DESCRIPTION OF THE EMBODIMENTS

Figure 2B:
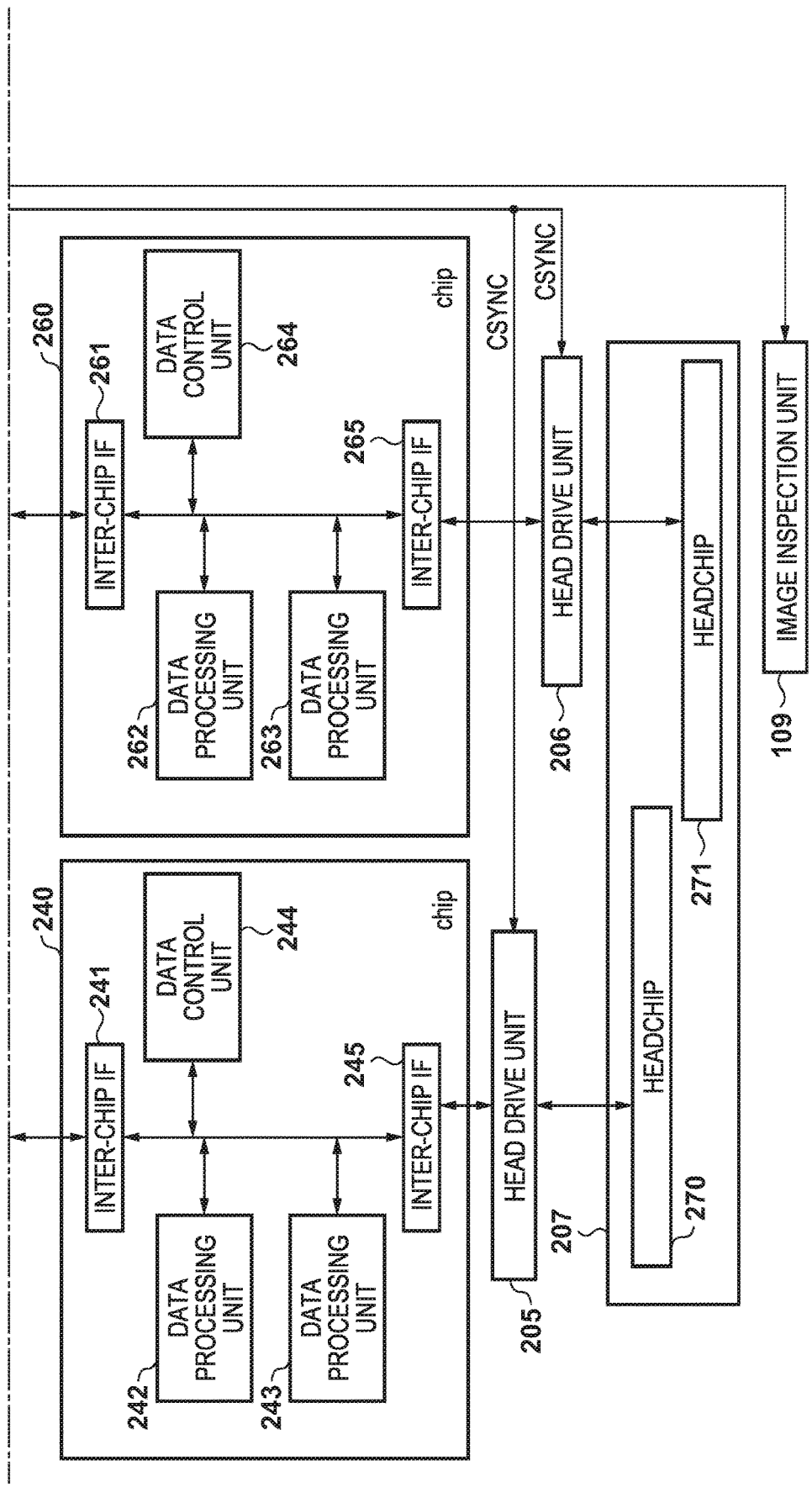

Exemplary embodiments of the present invention will now be described in detail in accordance with the accompanying drawings. Note that in the following description, the same reference numerals will denote the same components throughout the drawings. Hence, components that have been described once will be referred to by using the same reference numerals, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element (or nozzle)" generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

FIG. 1 is a view showing the schematic arrangement of a printing apparatus using inkjet full-line printheads according to an exemplary embodiment of the present invention. This printing apparatus is suitable as a printer, for example, in a photo printing lab or the like, which uses a sheet-like print medium such as a rolled continuous sheet or a cut sheet to print a large number of images at a high speed.

As shown in FIG. 1, a printing apparatus 10 includes units of a printing unit 100, a sheet supply unit 101, and discharge unit 102. The sheet supply unit 101 is a unit that stores and supplies a rolled continuous sheet or a cut sheet. A sheet is conveyed in an X direction in FIG. 1.

The printing unit 100 is a unit that forms an image on a conveyed sheet by using printheads 105, 106, 107, and 108. The printing unit 100 includes a plurality of conveyance rollers 103 and 104 that convey the sheet. Each of the printheads 105 to 108 has a printing width that falls within the range of the maximum width of a sheet estimated to be used and is a full-line printhead on which a nozzle array arranged with a plurality of nozzles for discharging ink is formed. The printheads 105 to 108 are arrayed along a conveyance direction (X direction) in parallel to each other. The four printheads 105 to 108 discharge inks of four colors, C (cyan), M (magenta), Y (yellow), and K (black), respectively. Note that the number of ink colors and the number of printheads are not limited to four, and it may be a single long printhead on which a plurality of chips, each including a plurality of nozzle arrays perpendicular to the conveyance direction, are arranged in a staggered manner.

Note that as the inkjet method, it is possible to employ a method using heating elements, a method using piezoelectric elements, a method using electrostatic elements, a method using MEMS elements, or the like. The color inks are supplied from ink tanks (not shown) via ink tubes to the printheads 105, 106, 107, and 108, respectively.

The discharge unit 102 is a unit that conveys a sheet cut by a cutter (not shown) when using a continuous sheet or conveys an intact sheet when using a cut sheet, distributes the printed sheet to a different discharge tray (not shown) for each group as needed, and discharges the distributed sheet. A control unit 110 is a unit that controls each unit of the printing apparatus. An image inspection unit 109 is a unit that reads and inspects images printed by the printheads 105 to 108.

FIGS. 2A and 2B are block diagrams showing the arrangement of the control unit shown in FIG. 1.

A printhead module 207 whose printing width covers the sheet width is formed by connecting two headchips 270 and 271 for each print range. Four nozzle arrays that discharge four color inks CMYK are integrated in each headchip. The four nozzle arrays correspond to the printheads 105, 106, 107, and 108.

A control system that controls a printing operation by controlling the printhead module 207 is formed by five chips serving as a CHIP 200, a CHIP 230, a CHIP 240, a CHIP 250, and a CHIP 260, a head drive unit 205, a head drive unit 206, and a conveyance control unit 211. As obvious from FIGS. 2A and 2B, the following components are connected by inter-chip interfaces, and the components can exchange information via the corresponding interface. That is,
the CHIP 200 and the CHIP 230,
the CHIP 200 and the CHIP 250,
the CHIP 230 and the CHIP 240,
the CHIP 250 and the CHIP 260,
the CHIP 240 and the head drive unit 205, and
the CHIP 260 and the head drive unit 206 are connected by inter-chip interfaces, respectively. Note that although the inter-chip interfaces are not limited to a particular interface specification, a high-speed serial interface such as PCI-EXPRESS can be used.

Information to be stored in an external memory 209, which is connected to the main body of the printing apparatus 10, is received via a memory controller 216, and image data is received from a print data input unit 208 via a data reception interface (I/F) 219. Here, assume that the image data to be input is quantized color component image data corresponding to the inks.

The input image data needs to be converted into a format that can be processed by the printheads. For example, there are processing for converting density information into discharge information corresponding to the each nozzle, processing for generating data to complement printing by a discharge failure nozzle, and the like. This embodiment physically includes a plurality of processing units and processing chips (CHIPs) to perform these plurality of processing operations at a high speed. More specifically, such processing units include a data processing unit 217, a data processing unit 232, a data processing unit 252, a data processing unit 233, a data processing unit 253, a data processing unit 242, a data processing unit 262, a data processing unit 243, and a data processing unit 263.

Here, the data processing units 232 and 252, the data processing units 233 and 253, the data processing units 242 and 262, and the data processing units 243 and 263 each perform parallel processing of the same processing contents to increase the processing speed. The data processing units 232, 233, 242, and 243 serially and sequentially execute data processing, and the data processing units 252, 253, 262, and 263 serially and sequentially execute data processing.

In the printhead module 207 whose printing width covers the range of the sheet width, the headchip 270 and the headchip 271 are controlled by the head drive unit 205 and the head drive unit 206, respectively. The two headchips are responsible for printing separate ranges with respect to the width direction (Y direction in FIG. 1) of a sheet.

A CPU 212 communicates with the print data input unit 208 via the data reception interface 219, confirms the completion of input preparation of the print data input unit 208, and requests image data and printing conditions of the image data. The printing conditions indicate, for example, the sheet size, the print resolution, the data processing method, and the like. Based on the received printing conditions, the control contents to operate a data control unit 214 are set in a table 213 by the CPU 212. At this time, the control contents of all of the plurality of sheets may be set in the setting table 213 or the contents may be added optionally during a printing operation.

After setting the control contents in the setting table 213, the operation of the data control unit 214 is enabled. In response, the data control unit 214 refers to the first contents of the setting table 213, sets processing contents to the data processing unit 217 based on the set contents, and outputs a control signal to start the processing. In response, the data processing unit 217 receives the control signal from the data control unit 214 and starts the data processing. The data processing unit 217 reads out unprocessed data from the external memory 209 and transmits the processed data to the data processing unit 232 of the CHIP 230 via a an inter-chip IF 220. After the completion of transmission, a completion notification is issued to both the data control unit 214 and a data control unit 234. Since the data processing unit 217 also serves the role of diverting data to the CHIP 230 and the CHIP 250, the same processing is performed on the data processing unit 252 and a data control unit 254.

Upon receiving the control signal from the data control unit 234, the data processing unit 232 executes, on the processing result of the data processing unit 217, processing which it is responsible for and transmits the obtained processing result to the data processing unit 233. Upon receiving the control signal from the data control unit 234, the data processing unit 233 executes, on the processing result of the data processing unit 232, processing which it is responsible for and transmits the obtained processing result to the data processing unit 242 of the CHIP 240 via an inter-chip IF 235. After the completion of the transmission, a completion notification is issued to both the data control unit 234 and a data control unit 244.

Upon receiving the control signal from the data control unit 244, the data processing unit 242 executes, on the processing result of the data processing unit 233, the processing which it is responsible for and transmits the obtained processing result to the data processing unit 243. Upon receiving the control signal from the data control unit 244, the data processing unit 243 executes, on the processing result of the data processing unit 242, processing which it is responsible for and transmits the obtained processing result to the head drive unit (head drive circuit) 205 via an inter-chip IF 245. The head drive unit 205 receives a signal synchronized with sheet conveyance and a print start/completion signal from a sheet conveyance synchronization signal generation unit 215, and generates a driving signal to the headchip 270 of the printhead module 207. The headchip 270 prints an image by discharging inks in accordance with the driving signal from the head drive unit 205.

The signal output method of the sheet conveyance synchronization signal generation unit 215 is set in the setting table 213. Accordingly, the sheet conveyance synchronization signal generation unit 215 outputs a conveyance synchronization signal CSYN to the head drive units 205 and 206 based on the contents of the setting table 213 and an encoder signal which indicates the position of the sheet and is transmitted from an encoder 210 installed in a sheet conveyance mechanism (not shown).

At the time when the head drive unit 205 has prepared the data that is to be transmitted to the headchip 270, the CPU 212 starts the sheet conveyance operation by transmitting an instruction to the conveyance control unit 211 via a control IF 218.

The same operations as those of the CHIP 230 and the CHIP 240 are performed for the CHIP 250 and the CHIP 260, respectively. The same operations as those of the head drive unit 205 and the headchip 270 are performed for the head drive unit 206 and the headchip 271, respectively. Hence, a description thereof will be omitted.

FIG. 3 is a block diagram, showing the details of a part of the arrangement shown in FIGS. 2A and 2B, for explaining the detailed operation of the data processing units and the data control units. Here, the operation of the data processing unit 217 and the data control unit 214 of the CHIP 200 and the data processing unit 232, the data processing unit 233, and the data control unit 234 of the CHIP 230 will be exemplified.

As shown in FIG. 3, the data processing units 217, 232, and 233 have the same arrangement, that is, the data processing units include reception buffers 304, 404, and 407, process execution units 306, 406, and 408, and process completion notification units 305, 405, and 409, respectively. The data control units 214 and 234 also have the same arrangement, that is, the data control units include a setting table information reception units 301 and 401, reception buffer management unit 302 and 402, and process setting/start notification units 303 and process setting/start notification unit 403, respectively.

When the CPU 212 activates the data control unit 214, the setting table information reception unit 301 receives the setting contents from the setting table 213. When setting content processing is completed on the data processing unit 217, the next processing content is read out from the setting table 213. Here, to perform processing setting on the data processing unit 217 and to cause the data processing unit to start the processing without waiting for the readout time of the setting table 213, one set of contents of the setting table 213 is read ahead and held, and the next set of contents is read out while processing of the held setting contents is being executed.

The reception buffer management unit 302 manages the held data amount of the reception buffer 304 of the data processing unit 217 and the held data amount of the reception buffer 404 of the data processing unit 232. A unit of processing executed by the data processing unit 217 at once and that executed by the data processing unit 232 at once may not necessarily be the same. For example, the data processing unit 217 processes eight lines of image data in the sheet conveyance direction at once, and the data processing unit 232 processes one line of image data in the sheet conveyance direction at once. Also, for example, as shown in FIG. 1, processing may be executed by using, as the unit of processing, a rectangle such as 16 pixels in the X direction and 32 pixels in the Y direction. In either case, the reception buffer management unit 302 will manage the held data amounts by detecting whether sets of data processable by the process execution unit 306 are present in the reception buffer 304 and whether there is space in the reception buffer 404 in which each processing result will be written.

The reception buffer management unit 302 manages the held data amount of the reception buffer 304 based on a reception buffer write completion signal transmitted from the print data input unit 208 via the data reception interface 219 by which it is input and on a processing completion signal transmitted from the process completion notification unit 305 of the data processing unit 217. The reception buffer management unit 302 manages the held data amount of the reception buffer 404 based on a reception buffer write completion signal transmitted from the process completion notification unit 305 via an inter-chip IF 231 by which it is input and on a processing completion signal transmitted from the process completion notification unit 405 of the data processing unit 232.

The reception buffer management unit 402 discriminates whether the held data amount of the reception buffer 304 corresponds to a state in which only a data amount necessary for processing of the data processing unit 217 is held, and whether there is enough free space to hold the processing result of the data processing unit 217 in the reception buffer 404. If these conditions are satisfied, the process setting/start notification unit 303 notifies the process execution unit 306 of the data processing unit 217 of the processing contents based on the contents of the setting table of the setting table information reception unit 301 and starts the processing.

In the same manner, the reception buffer management unit 302 manages the held data amount of the reception buffer 404 based on the reception buffer write completion signal transmitted from the process completion notification unit 305 via the inter-chip IF 231 by which it is input and on the processing completion signal transmitted from the process completion notification unit 405.

The reception buffer management unit 402 manages the held data amount of the reception buffer 407 of the data processing unit 233 based on the reception buffer write completion signal transmitted from the process completion notification unit 405 and on the processing completion signal transmitted from the process completion notification unit 409.

The reception buffer management unit 402 discriminates whether the held data amount of the reception buffer 404 corresponds to a state in which only a data amount necessary for processing of the data processing unit 232 is held, and whether there is enough free space to hold the processing result of the data processing unit 232 in the reception buffer 407. If these conditions are satisfied, the process setting/start notification unit 403 notifies the process execution unit 406 of the data processing unit 232 of the processing contents based on the contents of the setting table of the setting table information reception unit 401 and starts the processing. Note that the setting table information reception unit 401 receives the contents of the setting table 213 via the inter-chip IF 231.

Figure 4:
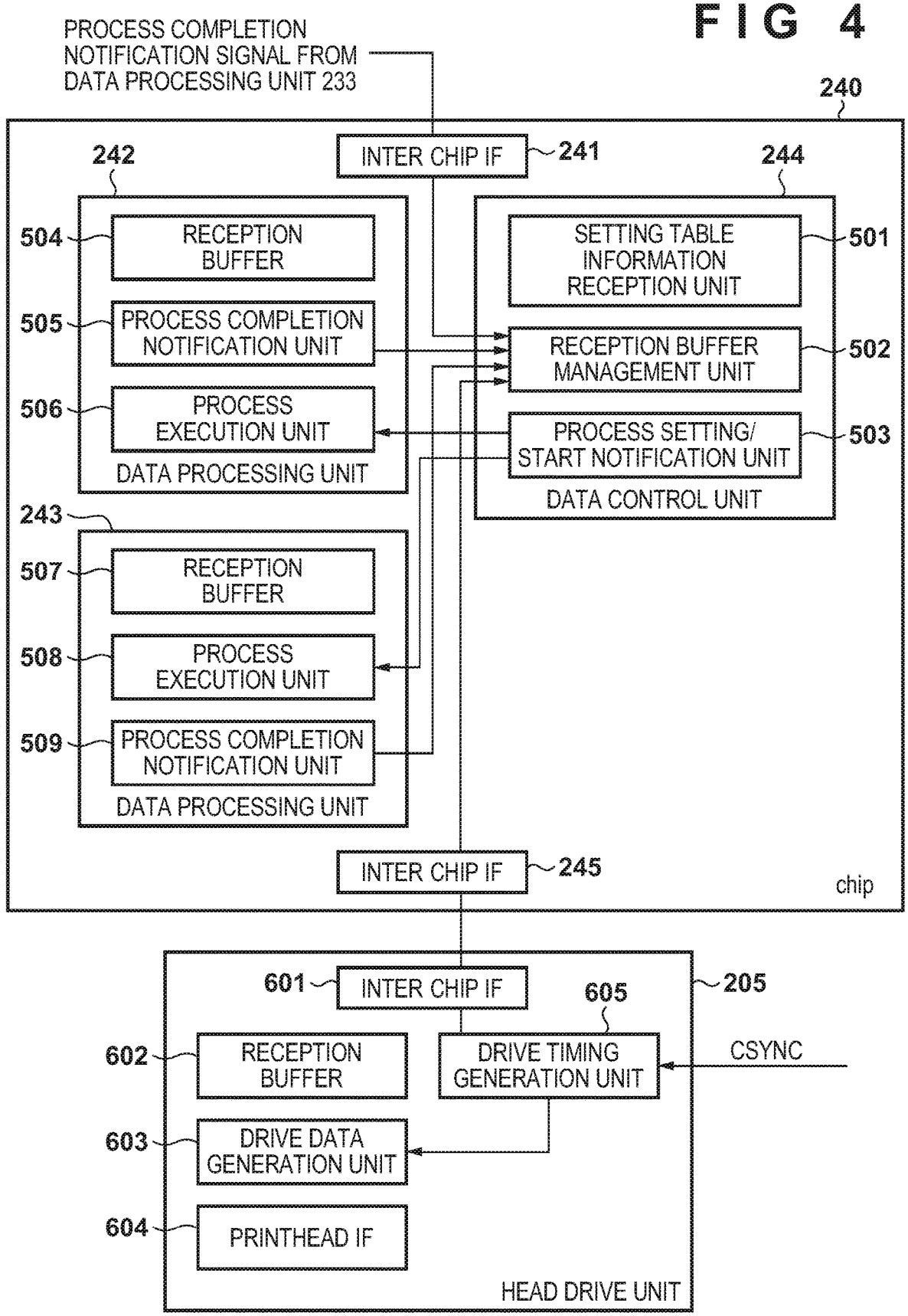
FIG. 4 is a block diagram, showing details of the part of the arrangement shown in FIGS. 2A and 2B, for explaining the detailed operation of the data processing units and a head driving unit.

FIG. 4 is a block diagram, showing the details of a part of the arrangement shown in FIGS. 2A and 2B, for explaining the detailed operation of the data processing units and the head drive units. Here, the operations of the head drive unit 205 and the data processing unit 243 of the CHIP 240 will be exemplified.

As it can be understood from comparing FIGS. 4 and 3, the arrangements of the data processing units 242 and 243 are the same as those of the data processing units 217, 232, and 233, and the arrangement of the data control unit 244 is the same as those of the data control units 214 and 234.

When the data control unit 244 is activated by the CPU 212, a setting table information reception unit 501 receives the setting contents from the setting table 213. When setting content processing is completed for the data processing unit 243, the next set of processing contents is read out from the setting table 213. A reception buffer management unit 502 manages the held data amount of a reception buffer 507 of the data processing unit 243 and the held data amount of a reception buffer 602 of the head drive unit 205. The held data amount of the reception buffer 602 of the head drive unit 205 is managed based on the reception buffer write completion signal transmitted from a process completion notification unit 509 and on a drive processing completion signal transmitted from a drive timing generation unit 605 via the inter-chip IF 245 by which it is input.

The reception buffer management unit 502 discriminates whether there is enough free space, in the reception buffer 602 of the head drive unit 205, to hold the processing result of the data processing unit 243. If this condition is satisfied, a process setting/start notification unit 503 notifies a process execution unit 508 of the data processing unit 243 of the processing contents based on the contents of the setting table of the setting table information reception unit 501 and starts the processing.

The drive timing generation unit 605 of the head drive unit 205 causes a drive data generation unit 603 to execute a driving signal generation operation based on the conveyance synchronization signal CSYNC transmitted from the sheet conveyance synchronization signal generation unit 215. Based on the conveyance synchronization signal CSYNC, the drive data generation unit 603 transmits a driving signal to the headchip 270 via a printhead IF 604.

The setting contents of the setting table will be described next.

Figure 5:
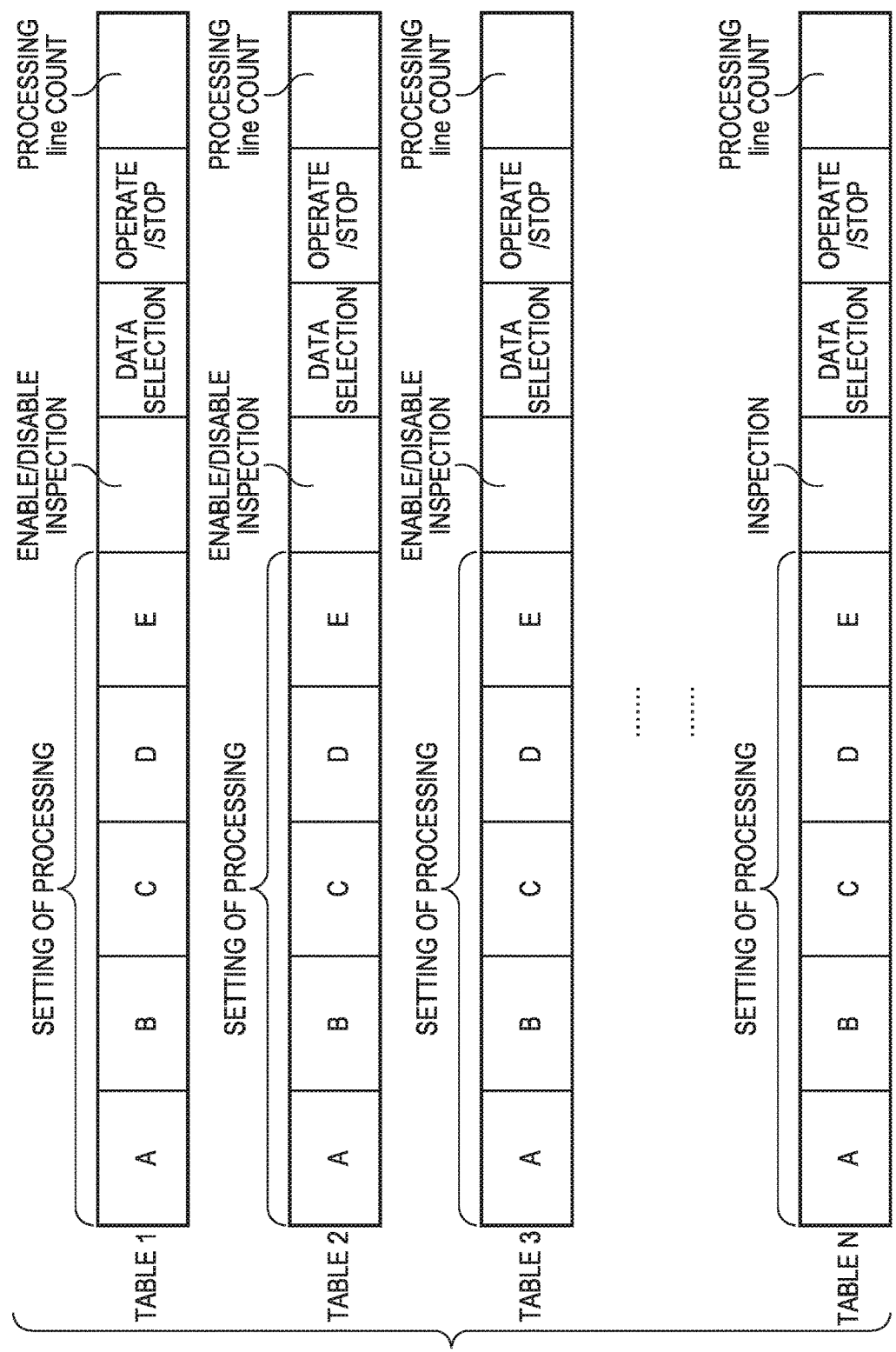
FIG. 5 is a view showing the structure of setting tables.

FIG. 5 is a view showing the structure of the setting table.

As shown in FIG. 5, the setting table includes a plurality of table (regions) 1, 2, . . . , and N each set as one unit of an area along the sheet conveyance direction and define the operation settings of processing in each area.

Figure 6:
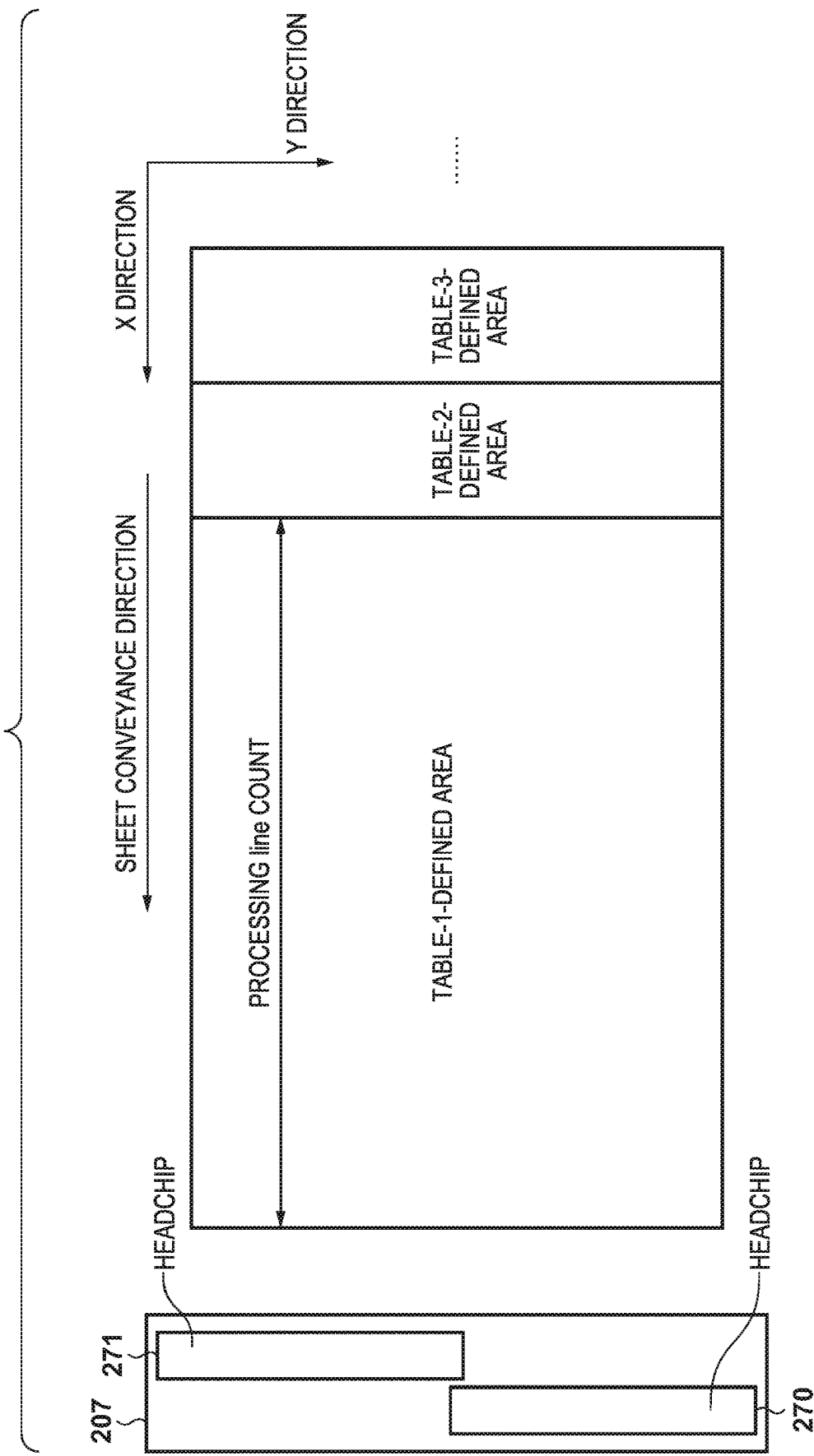
FIG. 6 is a view showing a correspondence between an area of a sheet and setting contents of a table 1, a table 2, and a table 3 shown in FIG. 5.

FIG. 6 shows the correspondence between the areas of the sheet and the setting contents of the tables 1, 2, and 3 shown in FIG. 5.

The size of the area, that is, the processing line count in this case, is set in each table. Each data selection field may be used by a user to make a selection to print, instead of the image data the user wants to print, an inspection pattern for inspecting the operation state of the printing apparatus.

In a case where a setting to execute the printing of the inspection pattern is made in the data selection field, the data of the inspection pattern which has been held in advance in the external memory 209 is selected and processed instead of the image data received from the print data input unit 208.

In a case where the image inspection unit 109 is to inspect the printed inspection pattern, the image inspection unit 109 needs to be notified of the timing at which the inspection pattern will pass the image inspection unit 109. In this case, the inspection enable/disable setting field of each table can be set to "inspection enabled" so that the sheet conveyance synchronization signal generation unit 215 can generate a signal to notify the image inspection unit 109 of the image inspection timing, and the image inspection unit 109 can perform an inspection operation based on this signal. Also, the processing contents of the setting fields of respective processing operations A to E may be changed to the settings for the inspection pattern in accordance with the setting of the inspection pattern printing operation. For example, a setting that turns off the processing to complement a discharge failure nozzle with another nozzle only when a discharge failure inspection pattern is being printed or the like can be considered.

As can be understood from the arrangement shown in FIGS. 2A and 2B, this printing apparatus includes the five data control units 214, 234, 244, 254, and 264 and the nine data processing units 217, 232, 233, 242, 243, 252, 253, 262, and 263. Although different sets of data are handled in the data control operations executed by the respective five data control units 214, 234, 244, 254, and 264, the processing operation of each data control unit is the same. Although different sets of data are handled in the data control operations executed by the respective nine data processing units 217, 232, 233, 242, 243, 252, 253, 262, and 263, the processing operation of each data processing unit is the same. More specifically, the CHIP 200 integrates the data control unit 214 and the data processing unit 217. The CHIP 230 integrates the data processing units 232 and 233 and the data control unit 234, and the CHIP 240 integrates the data processing units 242 and 243 and the data control unit 244. The CHIP 250 integrates the data processing units 252 and 253 and the data control unit 254, and the CHIP 260 integrates the data processing units 262 and 263 and the data control unit 264.

In addition, as can be understood from the arrangement shown in FIGS. 2A and 2B, the data control unit 214 controls the data processing operation of the data processing unit 217, and the data control unit 234 controls the data processing operations of the data processing units 232 and 233. The data control unit 244 controls the data processing operations of the data processing units 242 and 243, the data control unit 254 controls the data processing operations of the data processing units 252 and 253, and the data control unit 264 controls the data processing operations of the data processing units 262 and 263.

The operations of the five data control units and the nine data processing units will be described next. As described above, since the five data control units perform a common operation, the data control unit 214 will be exemplified here. Similarly, since the nine data processing units perform a common operation, the data processing unit 217 will be exemplified here.

Figure 7:
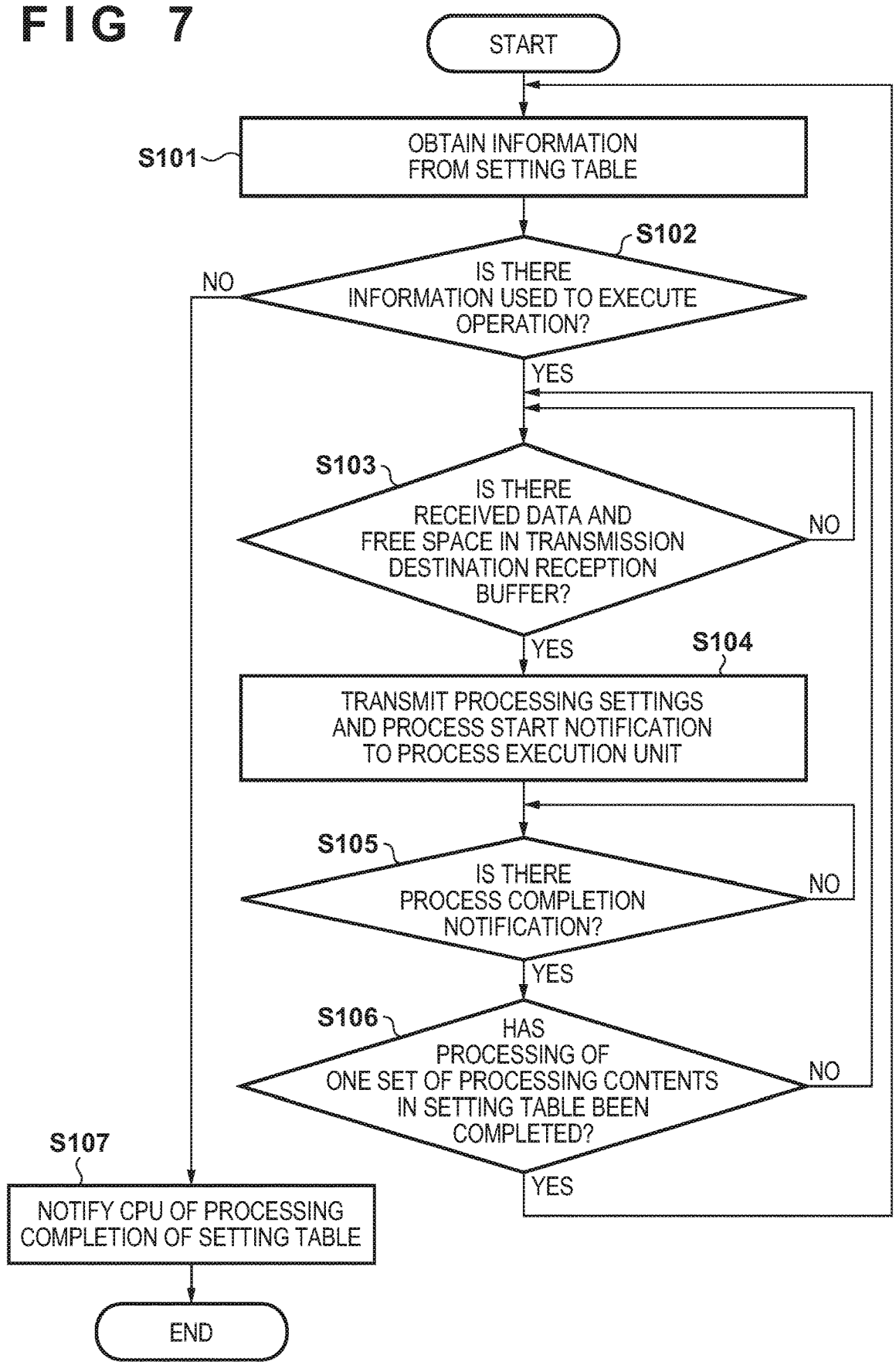
FIG. 7 is a flowchart for explaining a data control operation of the data control unit.

FIG. 7 is a flowchart showing the data control operation executed by the data control unit 214.

When the CPU 212 starts the operation of the data control unit 214, the setting table information reception unit 301 obtains, in step S101, the setting contents from the setting table 213. Next, in step S102, the obtained setting contents are analyzed and it is checked whether the setting information that used to execute the operation is present. If the setting information that is used to execute the operation is present, the process advances to step S103. Otherwise, the process advances to step S107.

In step S103, the process setting/start notification unit 303 checks whether there is processable data, in the reception buffer 304 as a management target which is managed by the data processing unit 217, which the data processing unit 217 receives, and checks whether there is free space in the reception buffer 404 which is the data transmission destination of the data processing unit 217. More specifically, the process setting/start notification unit 303 obtains the states of these respective buffers from the reception buffer management unit 302 and checks the obtained states. Here, if it is confirmed that there is free space in each of these buffers, the process advances to step S104. In step S103, the process setting/start notification unit continues to monitor the state of each buffer until free space is confirmed in the buffer. In step S104, the process setting/start notification unit 303 notifies the process execution units 306 and 406, which are to process the data stored in these buffers, of the processing settings and the start of processing.

In step S105, the reception buffer management unit 302 receives a process completion notification from each of the process completion notification units 305 and 405. In step S106, it is confirmed whether the processing of one set of processing contents set in the setting table 213 has been completed. If the processing has not been completed, the process returns to step S103, and a process start notification is transmitted again to the data processing unit 217. On the other hand, if it is confirmed that the processing of one set of processing contents set in the setting table 213 has been completed, the process returns to step S101, the next set of setting contents is obtained from the setting table 213, and the above-described processing is repeated.

When the processes of step S101 to S106 has been executed one or more times and there is no more operation which is to be executed in accordance with the setting contents set in the setting table 213, it is determined that the processing set in the setting table 213 has been completed, and the process advances to step S107. Subsequently, in step S107, the data control unit 214 notifies the CPU 212 of the completion of the processing.

Figure 8:
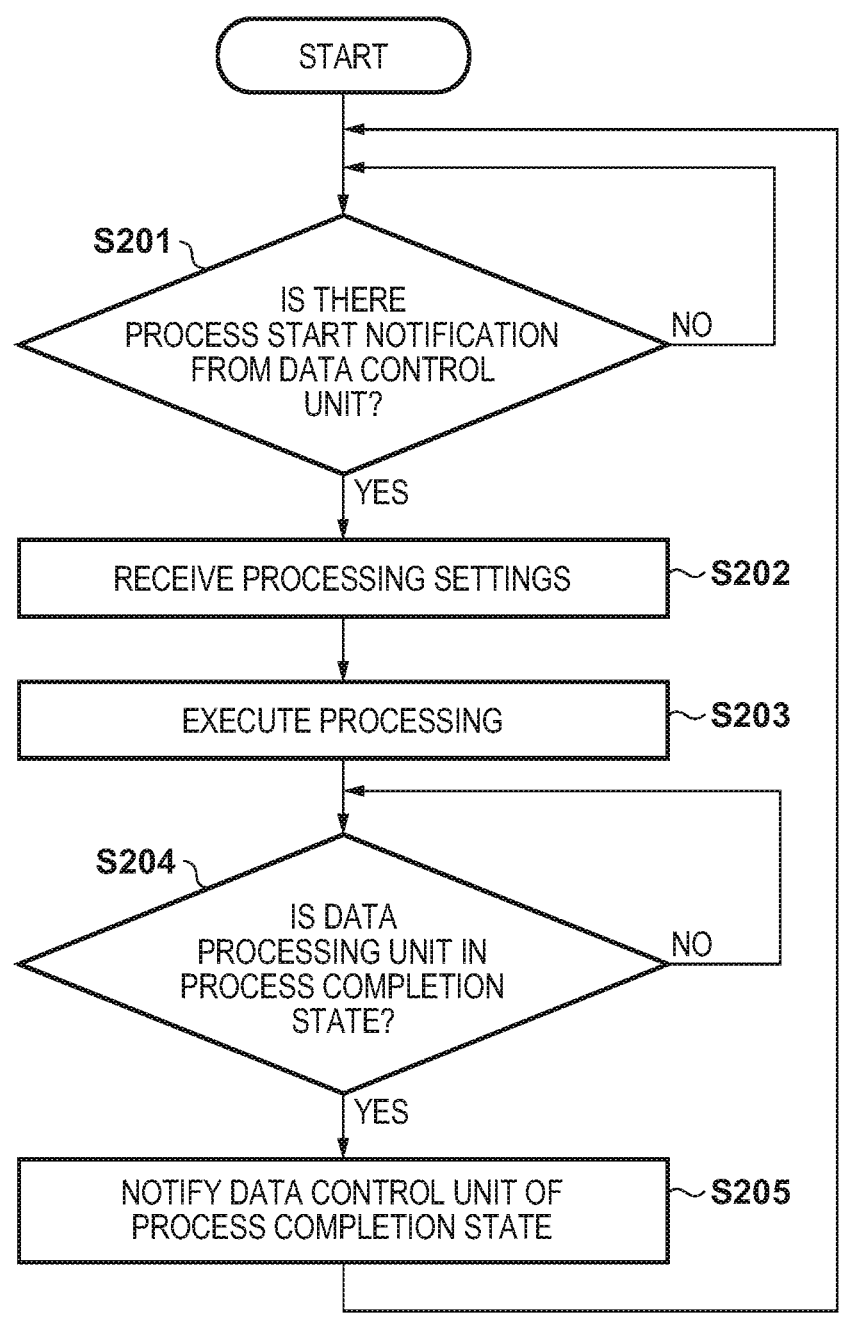
FIG. 8 is a flowchart for explaining a data processing operation of the data processing unit.

FIG. 8 is a flowchart showing the data processing operation executed by the data processing unit 217.

When the CPU 212 starts the operation of the data processing unit 217, the data processing unit 217 waits, in step S201, to receive the process start notification from the data control unit 214. When the data processing unit receives the process start notification, the process advances to step S202. The CPU reflects, in step S202, the received processing settings on the data processing unit 217 and executes, in step S203, its own processing in the process execution unit 306.

In step S204, the CPU waits for the completion of the processing. When the processing is completed, the process advances to step S205, and the CPU notifies the data control unit 214 that the data processing unit 217 is in a process completion state. Subsequently, the process returns to step S201, and the CPU waits to receive the next process start notification.

Figure 9:
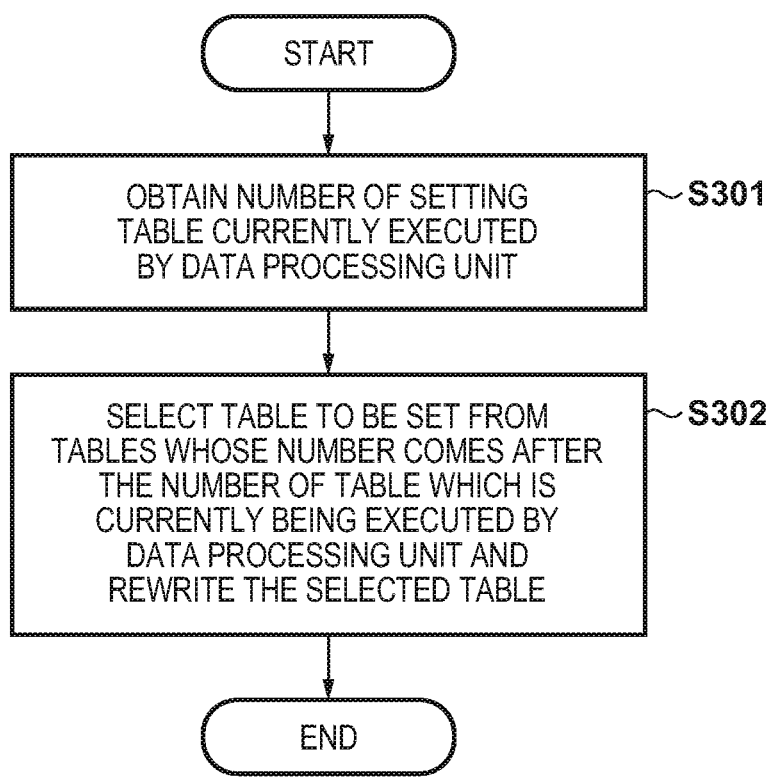
FIG. 9 is a flowchart showing processing executed by the data processing unit when a CPU updates the contents of the setting table during a printing operation.

FIG. 9 is a flowchart showing the processing executed by each data processing unit when the CPU updates the contents of the setting table during a printing operation. This processing is executed when the CPU 212 needs to update the setting table 213 by some kind of condition.

First, in step S301, the CPU obtains, from the data control unit 214, the number of the setting table that is currently executed by the data processing unit 217. The aforementioned number of the setting table in this case refers to a table number such as table 1, table 2, table 3, . . . , or table N as shown in FIG. 5.

Subsequently, in step S302, the CPU selects the table to be changed from those whose number comes after the number of the table which is being currently executed by the data processing unit 217, and rewriting of a setting or an addition of a setting is performed. The setting table information reception unit 301 obtains the contents of the added setting table after the execution of the current processing operation is completed and reflects the added setting table contents on the processing operation, thereby allowing the operation settings to be switched on a setting table basis in a state in which the operations of the plurality of data processing units are synchronized. The plurality of data processing units can use the common setting table 213 to efficiently execute data processing in this manner.

Hence, according to the above-described embodiment, based on the setting contents set in one setting table, the plurality of data processing units of the plurality of chips (CHIPs) can be operated and their operations can be synchronized and managed by the plurality of data control units. As a result, it is possible to increase the processing speed by causing the plurality of data processing units to operate in parallel, and the CPU can be released from the load of a management control operation by performing, without intervention of the CPU, synchronized management by the corresponding plurality of data control units.

Note that although the above-described embodiment has exemplified, as shown in FIGS. 2A and 2B, an arrangement in which data processing operations of two headchips, forming the printhead module whose printing width is the sheet width, are parallelized, the present invention is not limited to this. For example, as shown in FIGS. 10A and 10B, an arrangement in which processing operations of four sets of color component data forming the image data are parallelized may be applied.

Figure 10A:
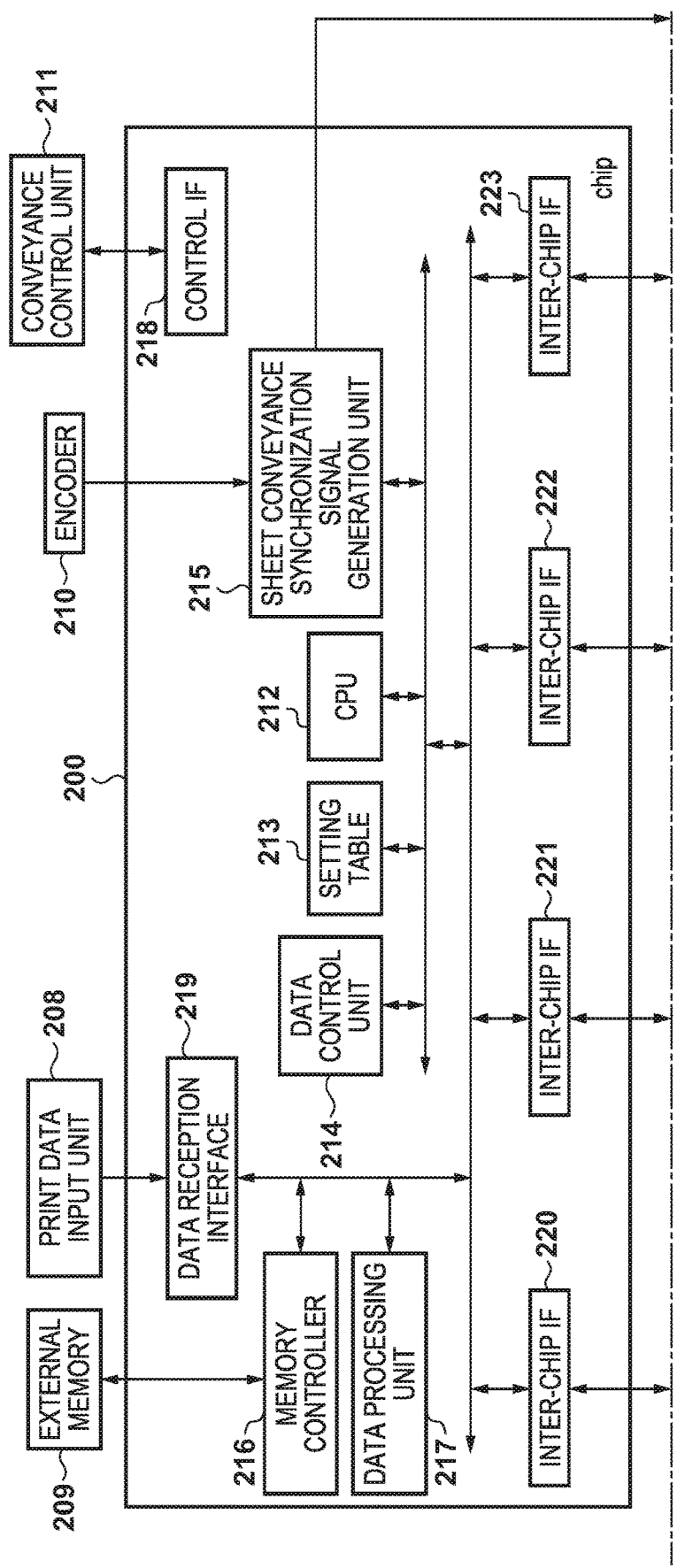
FIGS. 10A and 10B are block diagrams showing an arrangement for parallelizing the processing operations of four sets of color component data of C (cyan), M (magenta), Y (yellow), and K (black).
Figure 10B:
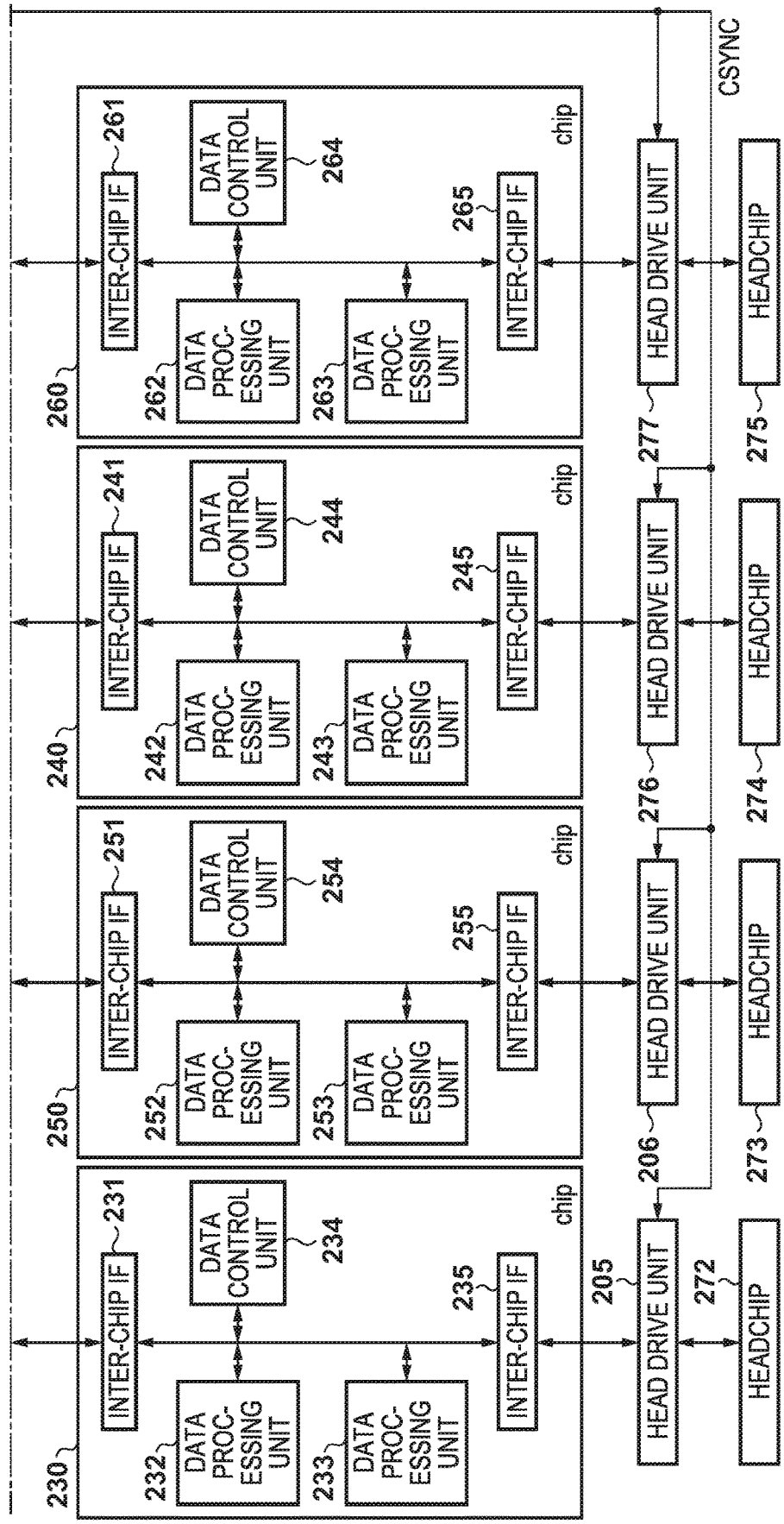

FIGS. 10A and 10B are block diagrams showing an arrangement for parallelizing the processing operations of four sets of color component data of C (cyan), M (magenta), Y (yellow), and K (black). Note that, in FIGS. 10A and 10B, the same reference numerals denote the same components as those already described in FIGS. 2A and 2B, and a description thereof is omitted.

According to FIGS. 10A and 10B, data processing of each color component is executed by a corresponding one of CHIPs 230, 240, 250, and 260. These CHIPs are responsible for the processing operations of the four color component data of C (cyan), M (magenta), Y (yellow), and K (black), respectively. Hence, the CHIP 200 is further provided with two inter-chip IFs 222 and 223, and the CHIP 200 is connected to the CHIPs 240 and 260 via these interfaces. The CHIPs 240 and 260 are further connected to two head drive units 276 and 277, respectively. The four head drive units 205, 206, 276, and 277 drive headchips 272, 273, 274, and 275 which discharge C (cyan) ink, M (magenta) ink, Y (yellow) ink, and K (black) ink, respectively.

Note that the internal arrangements of the head drive units 276 and 277 are the same as those of the above-described head drive units 205 and 206. Each of the headchips 272, 273, 274, and 275 is an element substrate which is to be incorporated in a full-line printhead whose printing width is the same as the sheet width.

Note that although the above-described embodiment exemplified a single-function printer, the application range of the present invention is not limited to this. The present invention is also applicable to a printer (multifunction printer) on which an optical scanner is mounted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108318, filed May 31, 2017, which is hereby incorporated by reference herein in its entirety.

What is claimed is:

1. A printing control apparatus for a printing apparatus that performs printing by using a printhead formed from a plurality of headchips, the printing control apparatus comprising:

a first chip configured to integrate (1) a CPU, (2) a table configured to store processing contents set by the CPU, and (3) a processing circuit configured to process a plurality of data and to transfer the processed plurality of data to chips of a next stage, respectively;

a plurality of second chips, each second chip being connected to the first chip via a predetermined interface, and each second chip integrating (1) a plurality of processing circuits, each being configured to process print data based on the processed data transferred from the first chip to be used in a respective one of the plurality of headchips in accordance with the processing contents set in the table and (2) a control circuit configured to (a) wait for processing completion in a first one of the plurality of processing circuits, and (b) cause a second one of the plurality of processing circuits to execute next processing for the print data in response to the processing completion in the first one of the plurality of processing circuits in accordance with the processing contents set in the table; and a plurality of drive circuits configured to drive, based on the print data processed by the plurality of processing circuits of the plurality of the second chips, each of a corresponding plurality of headchips.

2. The apparatus according to claim 1, wherein synchronization is performed for conveying a print medium to perform printing by the printhead.

3. The apparatus according to claim 1, further comprising:
a conveyance unit configured to convey, in a predetermined direction, a sheet-like print medium on which printing by the printhead is to be performed.

4. The apparatus according to claim 3, wherein the printhead is a full-line printhead having a printing width which corresponds to the size of the sheet-like print medium in a width direction.

5. The apparatus according to claim 4, wherein the plurality of headchips are arranged in the width direction so that the full-line printhead can perform printing in accordance with the printing width.

6. The apparatus according to claim 4, wherein the full-line printhead performs printing by using the plurality of headchips based on print data of a plurality of color components.

7. The apparatus according to claim 3, wherein the table includes a plurality of regions in which a plurality of setting contents are to be set in accordance with a conveyance direction of the print medium by the conveyance unit.

8. The apparatus according to claim 7, wherein the first chip further integrates a control circuit configured to cause the processing circuit in the first chip to execute the processing contents stored in the table, and
wherein each of the plurality of second chips does not integrate a CPU.

9. The apparatus according to claim 8, wherein the CPU activates the control circuit integrated in the first chip, and
wherein in response to the activation, the control circuit reads out processing contents stored in one of the plurality of regions included in the table, sets the readout processing contents on the processing circuit integrated in the first chip, confirms that there is enough space in a buffer of the processing circuit integrated in the first chip and in a buffer of one processing circuit of the plurality of processing circuits integrated in each of the plurality of second chips connected via the interface, and causes the set processing contents to be executed.

10. The apparatus according to claim 9, wherein the control circuit integrated in the first chip reads out next processing contents when processing of the processing contents of each of the plurality of regions included in the table is completed, and the control circuit causes the processing circuit integrated in the first chip to execute the read-out next processing contents.

11. The apparatus according to claim 9, wherein the control circuit integrated in each of the plurality of second chips reads out processing contents stored in one of the plurality of regions included in the table, confirms that there is enough space in a buffer of the one processing circuit of the plurality of processing circuits and in a buffer of another processing circuit of the plurality of processing circuits integrated in each of the plurality of second chips, and causes the one processing circuit to execute the read-out processing contents.

12. A control method of a printing control apparatus for a printing apparatus that performs printing by using a printhead formed from a plurality of headchips, the printing control apparatus including a first chip configured to integrate (1) a CPU, (2) a table configured to store processing contents set by the CPU, and (3) a processing circuit configured to process a plurality of data and transfer the processed plurality of data to chips of a next stage, the method comprising:

connecting each of a plurality of second chips to the first chip via a predetermined interface, each second chip integrating (1) a plurality of processing circuits and (2) a control circuit;

processing, by the plurality of processing circuits integrated in each of the plurality of second chips, print data based on the processed data transferred from the first chip to be used in respective ones of the plurality of headchips in accordance with the processing contents set in the table;

waiting for processing completion in a first one of the plurality of processing circuits integrated in each of the plurality of second chips, and causing a second one of the plurality of processing circuits integrated in each of the plurality of second chips to execute next processing for the print data in response to the processing completion in the first one of the plurality of processing circuit integrated in each of the plurality of second chips in accordance with the processing contents set in the table; and driving, based on the print data processed by the plurality of processing circuits integrated in each of the plurality of second chips, each of a corresponding plurality of headchips by a plurality of drive circuits.

13. The method according to claim 12, further comprising:
conveying, in a predetermined direction, a sheet-like print medium on which printing by the printhead is to be performed.

14. The method according to claim 13, wherein the table includes a plurality of regions in which a plurality of setting contents are to be set in accordance with a conveyance direction of the print medium.

15. The method according to claim 14, further comprising further integrating, in the first chip, a control circuit configured to cause the processing circuit integrated in the first chip to execute the processing contents stored in the table, while not integrating a CPU in each of the plurality of second chips.

16. The method according to claim 15, further comprising:
activating, by the CPU, the control circuit integrated in the first chip; and
in response to the activation, reading out processing contents stored in one of the plurality of regions included in the table, setting the readout processing contents on the processing circuit integrated in the first chip, confirming that there is enough space in a buffer of the processing circuit integrated in the first chip and in a buffer of one processing circuit of the plurality of processing circuits integrated in each of the plurality of second chips connected via the interface, and causing the set processing contents to be executed by the processing circuit in the first chip.

17. The method according to claim 16, further comprising:
reading out, by the control circuit integrated in the first chip, next processing contents when processing of the processing contents of each of the plurality of regions included in the table is completed; and
executing, by the processing circuit integrated in the first chip, the read-out next processing contents.

18. The apparatus according to claim 16, further comprising:
reading out, by the control circuit integrated in each of the plurality of second chips, processing contents stored in one of the plurality of regions included in the table; and
confirming that there is enough space in a buffer of the one processing circuit of the plurality of processing circuits and in a buffer of another processing circuit of the plurality of processing circuits integrated in each of the plurality of second chips and causing, by the control circuit integrated in each of the plurality of second chips, the one processing circuit to execute the read-out processing contents.

\* \* \* \* \*